US 7,755,308 B2

(12) United States Patent
Kayikci et al.

(10) Patent No.: US 7,755,308 B2
(45) Date of Patent: Jul. 13, 2010

(54) CONDUCTION ANGLE CONTROL OF A SWITCHED RELUCTANCE GENERATOR

(75) Inventors: Ekrem Kayikci, Peoria, IL (US); William James Tate, Dunlap, IL (US)

(73) Assignee: Caterpillar Inc, Peoria, IL (US)

(*) Notice: Subject to any disclaimer, the term of this patent is extended or adjusted under 35 U.S.C. 154(b) by 399 days.

(21) Appl. No.: 11/819,871

(22) Filed: Jun. 29, 2007

(65) Prior Publication Data

US 2009/0001911 A1 Jan. 1, 2009

(51) Int. Cl.
*H02P 5/00* (2006.01)
(52) U.S. Cl. .................................... 318/139; 318/432
(58) Field of Classification Search .................. 318/139, 318/140, 701, 432
See application file for complete search history.

(56) References Cited

U.S. PATENT DOCUMENTS

| | | | |
|---|---|---|---|
| 4,707,650 A | | 11/1987 | Bose |
| 5,012,172 A | * | 4/1991 | Sember ...................... 318/696 |
| 5,204,604 A | | 4/1993 | Radum |
| 5,493,195 A | * | 2/1996 | Heglund et al. ............. 318/701 |
| 5,789,893 A | | 8/1998 | Watkins |
| 6,011,377 A | * | 1/2000 | Heglund et al. ............. 318/701 |
| 6,051,942 A | | 4/2000 | French |
| 6,054,819 A | | 4/2000 | Pengov |
| 6,150,778 A | | 11/2000 | Morris |
| 6,211,633 B1 | * | 4/2001 | Jones et al. ............. 318/400.04 |
| 6,291,949 B1 | | 9/2001 | Green |
| 6,348,743 B1 | | 2/2002 | Sakasai et al. |
| 6,819,008 B2 | | 11/2004 | Kaplan et al. |
| 6,856,035 B2 | | 2/2005 | Brandon et al. |
| 6,972,533 B2 | | 12/2005 | Jordison et al. |
| 7,071,659 B1 | | 7/2006 | Torrey |
| 7,075,273 B2 | | 7/2006 | O'Gorman et al. |
| 7,106,020 B1 | | 9/2006 | McMillan |
| 2003/0011347 A1 | | 1/2003 | Kaplan |
| 2005/0067998 A1 | | 3/2005 | Green |
| 2005/0263329 A1 | | 12/2005 | Kuras |
| 2005/0263331 A1 | * | 12/2005 | Sopko et al. ................ 180/65.1 |
| 2006/0069488 A1 | * | 3/2006 | Sychra et al. .................. 701/69 |
| 2006/0197396 A1 | | 9/2006 | Pollock et al. |

FOREIGN PATENT DOCUMENTS

EP 1 030 438 A1 8/2000

* cited by examiner

*Primary Examiner*—Rina I Duda
(74) *Attorney, Agent, or Firm*—Finnegan, Henderson, Farabow, Garrett & Dunner

(57) ABSTRACT

A control system is disclosed. The control system has a switched reluctance generator coupled to provide electrical power through a DC bus to a motor. The control system also has a controller in communication with the switched reluctance generator, the motor, and the DC bus. The controller is configured to receive an indication of an amount torque or power required by the motor, determine a conduction angle of the switched reluctance generator based on the amount of torque or power required by the motor; and energize the DC bus with the electrical power provided by the switched reluctance generator based on the optimal conduction angle.

20 Claims, 7 Drawing Sheets

CONDUCTION ANGLE CONTROL OF A SWITCHED RELUCTANCE GENERATOR

TECHNICAL FIELD

This disclosure relates generally to a switched reluctance generator system and, more particularly, to conduction angle control of a switched reluctance generator.

BACKGROUND

Machines such as, for example, passenger vehicles, trains, marine vessels, construction equipment, excavating machines, etc., often have a combustion engine to power various operations of the machine. In the past, the power output of the combustion engine was usually mechanically coupled to traction devices (e.g., wheels or tracks) to propel the machine. In response to ever more stringent emissions requirements and design goals, however, different propulsion arrangements have been developed. Combustion engines are now commonly used to drive an electric machine, such as an inductance machine, a permanent magnet machine, or switched reluctance (SR) machine, which operates in a generating mode to energize a DC bus that is used to power an electric motor at the traction devices. This arrangement is advantageous because it permits running the combustion engine at a constant speed (i.e., a "sweet spot") that minimizes harmful emissions and/or maximizes fuel economy.

One challenge posed by this arrangement is to keep the DC bus energized such that sufficient power can be provided to the electric motor under a variety of load conditions. If a switched reluctance generator is used, the respective phases of the generator must be "fired" at appropriate rotational angles to energize the DC bus (e.g., charge a capacitor). Alternatively, if operating in a "motoring" mode, the respective phases of the motor must be similarly "fired" at the appropriate time. This is usually accomplished by responsively switching on and off transistors or other switching elements of an SR power converter connected to the DC bus. The power converter is switched in accordance with optimum "firing angles", or "turn on" and "turn off" angles ($\theta_{on}$ and $\theta_{off}$), of the respective phases of the SRG. In other words, $\theta_{on}$ and $\theta_{off}$ correspond to optimum angular positions along the rotational path of the SRG at which the transistors of the power converter are switched on and off to draw electrical current from the respective phase coils of the SRG to energize the DC bus.

One system that controls the conduction angle of a switched reluctance generator is described in U.S. Pat. No. 7,071,659 issued to Torrey et al. on Jul. 4, 2006 (the '659 patent). The system of the '659 patent includes an SRG coupled to power a load via a DC bus. The system includes a voltage controller that monitors the DC bus voltage via a feedback loop and makes changes to the conduction angle of the SRG to compensate for variations in the bus voltage caused by varying load conditions.

Although the system of the '659 patent may adjust the conduction angle of the SRG in response to changes in bus voltage, the response of the system may be inadequate. Particularly, the system response may be slow, because the voltage controller takes into account only the bus voltage as an indicator of the load applied to the system. Therefore, if the system is subject to a sudden increase or decrease in loading, the bus voltage may decrease or increase suddenly, and the load may be temporarily supplied with inadequate or excess power until the system can bring the bus voltage back to a desired level. This transient response may lead to less than optimum operation and/or malfunctioning of the load (e.g., a motor or another electronic device).

The present disclosure is directed to overcoming one or more of the problems set forth above.

SUMMARY OF THE INVENTION

One aspect of the disclosure is directed to a control system. The control system may include a switched reluctance generator coupled to provide electrical power through a DC bus to a motor. The control system may also include a controller in communication with the switched reluctance generator, the motor, and the DC bus. The controller may be configured to receive an indication of an amount of torque or power required by the motor, determine a conduction angle of the switched reluctance generator based on the amount of torque or power required by the motor, and energize the DC bus with the electrical power provided by the switched reluctance generator based on the conduction angle.

Another aspect of the invention is directed to a method of transferring power. The method may include providing electrical power from a switched reluctance generator through a DC bus to a motor, receiving an indication of an amount of torque or power required by the motor, and determining a conduction angle of the switched reluctance generator based on the amount of torque or power required by the motor. The method may further include energizing the DC bus with the electrical power provided by the switched reluctance generator based on the conduction angle.

DETAILED DESCRIPTION

Figure 1:
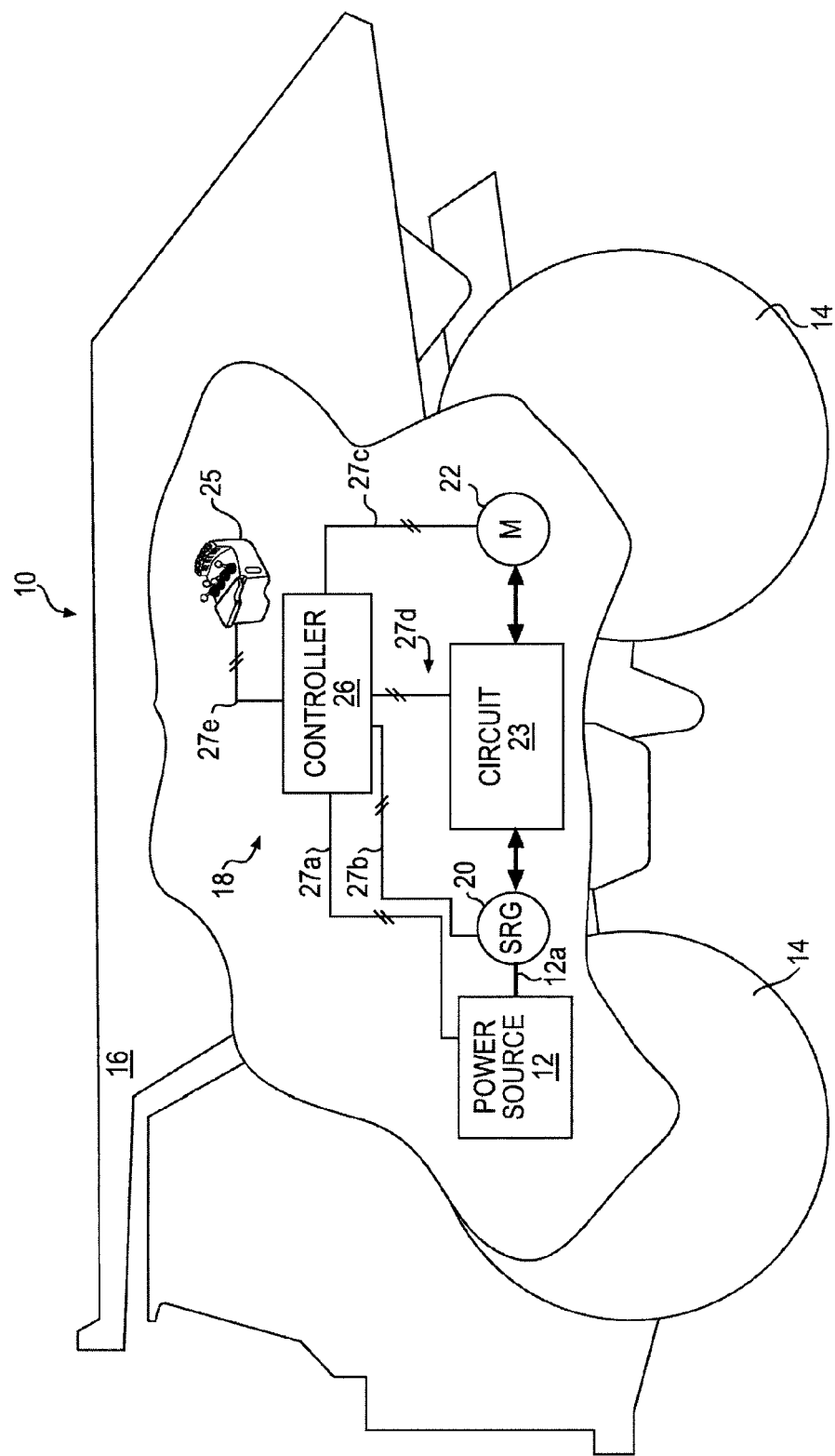
FIG. 1 shows a diagrammatic and schematic representation of an exemplary disclosed generator control system.

FIG. 1 illustrates an exemplary machine 10. Machine 10 may embody a stationary or mobile machine configured to perform some type of operation associated with a particular industry, such as mining, construction, farming, transportation, etc., and operates between or within work environments (e.g., construction site, mine site, power plants, on-highway applications, etc.). For example, machine 10 may embody a mobile machine such as an excavating machine, an on- or off-road haul truck, a passenger vehicle, or a marine vessel. Machine 10 may alternatively embody a stationary machine, such as a generator set, a pumping mechanism, or another suitable stationary operation-performing machine.

Machine 10 may include a power source 12, such as an internal combustion engine (e.g., a diesel engine, a gasoline engine, a gaseous fuel-powered engine) that combusts a mixture of fuel and air to generate a mechanical power output, which may be embodied in the rotation of a crankshaft 12a. The mechanical output of crankshaft 12a may be used to power operations of machine 10. For example, the mechanical power output may be used to propel the movement of machine 10 by way of traction devices 14, or to drive the movement of a work tool 16, among other things.

Machine 10 may also include a generator control system 18 to convert the mechanical power output into a form suitable to power the various operations of machine 10. Control system 18 may include a generator 20 coupled to crankshaft 12a to receive at least some of the mechanical power output from power source 12. Generator 20 may convert the mechanical power to electrical power, and be coupled to provide the electrical power to a motor 22 through a circuit 23. Control system 18 may also include a controller 26 operatively coupled to communicate with power source 12, with SRG 20, with motor 22, with circuit 23, and/or with an operator input device 25 by way of communication links 27a, 27b, 27c, 27d, and 27e, respectively.

Figure 2:
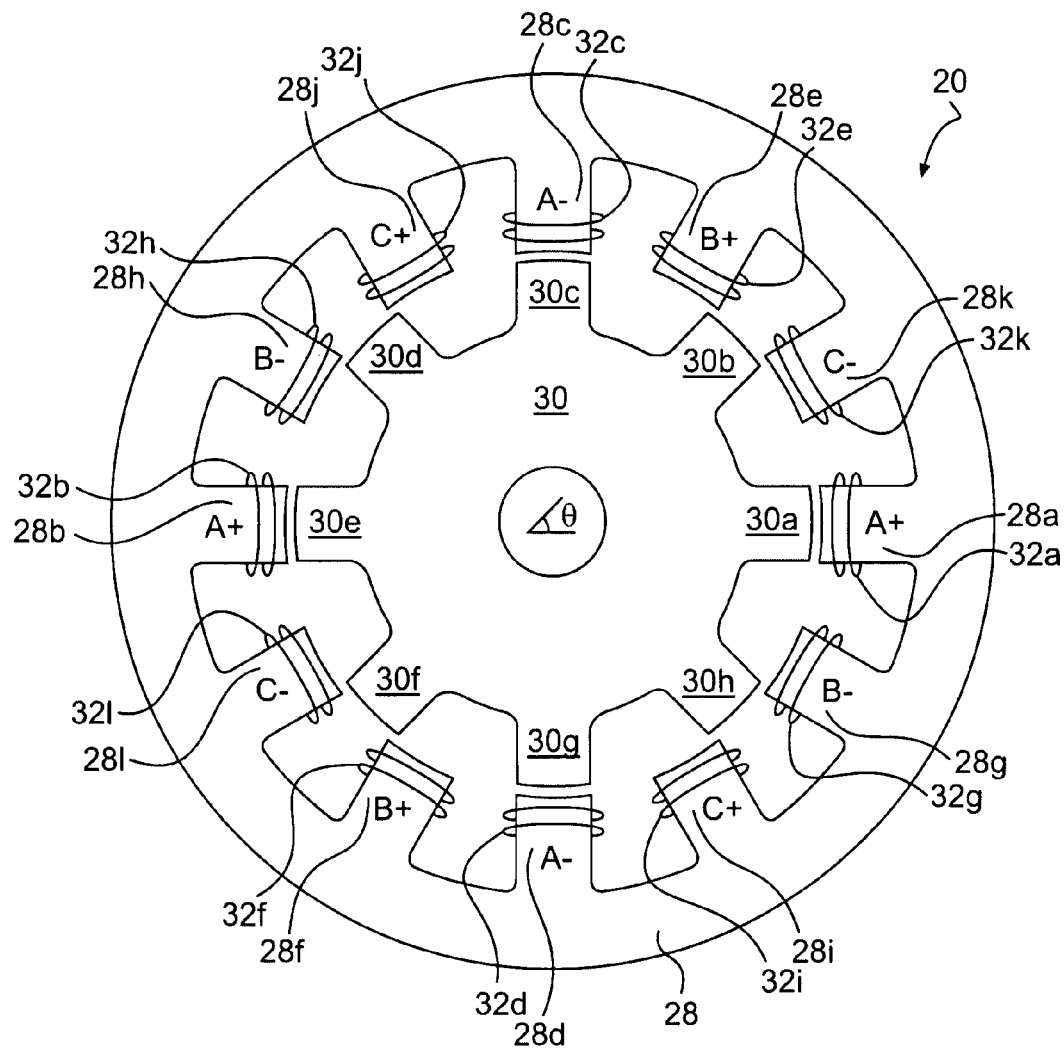
FIG. 2. shows a diagrammatic representation of an exemplary disclosed switched reluctance machine for use with the control system of FIG. 1.

FIG. 2 shows an exemplary generator 20. Generator 20 may be, for example, a 12/8 3-phase switched reluctance generator (SRG). That is, SRG 20 may include twelve (12) stator poles, eight (8) rotor poles, and three (3) conduction phases. SRG 20 may include a stator 28 and a rotor 30. Stator 28 may include twelve salient stator poles 28a-l grouped into stator pole sets. A stator pole set may include two or more stator poles corresponding to the number of phases (e.g., three) of SRG 20. The total of twelve stator poles 28a-l may be grouped into three phase sets (e.g., phases A, B, and C) such that stator poles 28a-d may be grouped into a first phase set (e.g., phase A), stator poles 28e-h may be grouped into a second phase set (e.g., phase B), and stator poles 28i-l may be grouped into a third phase set (e.g., phase C). Each of stator poles 28a-l may be wound by electrical coils 32a-l. For example, stator poles 28a-d may be wound by electrical coils 32a-d (phase A coils), stator poles 28e-h may be wound by electrical coils 32e-h, and stator poles 28i-l may be wound by electrical coils 32i-l, respectively. Further, stator 28 may include additional or fewer poles grouped into sets corresponding to more or less phases, if desired (e.g., two phases). However, the number and arrangement of poles and phases is immaterial for purposes for the present disclosure.

Rotor 30 may include a plurality of rotor poles, the number of rotor poles being based on the number of stator poles 28a-l. For example, rotor 30 may include a total of eight (8) rotor poles 30a-h. It is understood, however, that the number of rotor poles is exemplary only and not intended to be limiting. Any desired number of rotor poles may be used. Rotor 30 may be coupled to crankshaft 12a to receive at least a portion of the mechanical power output from power source 12. That is, during operation, crankshaft 12a may cause rotor 30 to rotate. The magnetic flux generated by the rotation of rotor 30 may induce a DC electric current in coils 32a-l. During phase A induction, the generated magnetic flux may induce a DC current in coils 32a-d. During phase B induction, the generated magnetic flux may be used to induce a DC current in coils 32e-h. Similarly, during phase C induction, the magnetic flux generated may induce a DC current in coils 32i-l. Specifically, the torque required and supplied by power source 12 to rotate rotor 30 against its tendency to magnetically align each of rotor poles 30a-h with a respective one of stator poles 28a-l may generate a magnetic flux that induces a DC current in coils 32a-d, 32e-h, and 32i-l, during induction of phases, A, B and C, respectively.

SRG 20 may also be equipped with current sensors (not shown) to measure the instantaneous phase currents present in each of phases A, B, and C. In other words, the sensors may measure a real-time current through each of coils 32a-d, 32e-h, and 32i-l, respectively. SRG 20 may also be equipped with rotor position sensors (not shown), such as optical encoders, Hall effect sensors, or resolvers to indicate an angular position of rotor 30. The sensors may generate signals indicative of values for each of the respective measured parameters (e.g., $i_a$, $i_b$, and $i_c$; $Hall_A$, $Hall_B$, and $Hall_C$; rotor position; etc.). The signals may be provided to controller 26 by way of communication link 27b for analysis in connection with the control algorithm disclosed herein.

Motor 22 may be any electric machine configured to convert an electrical power input into a mechanical power output. Motor 22 may be, for example, an inductance motor, or a permanent or switched reluctance motor. During operation, motor 22 may draw power from circuit 23 to rotate a rotor (not shown). The rotor may be coupled to rotate traction devices 14 by way of an output shaft (not shown), a torque converter (not shown), a transmission (not shown), or another coupling means. Motor 22 may be equipped with one or more sensors (not shown) to measure a real-time output shaft rotation speed. The sensors may generate a signal indicative of a value of the real-time output shaft rotation speed, which may be provided to controller 26 for the control algorithm disclosed herein.

Figure 3:
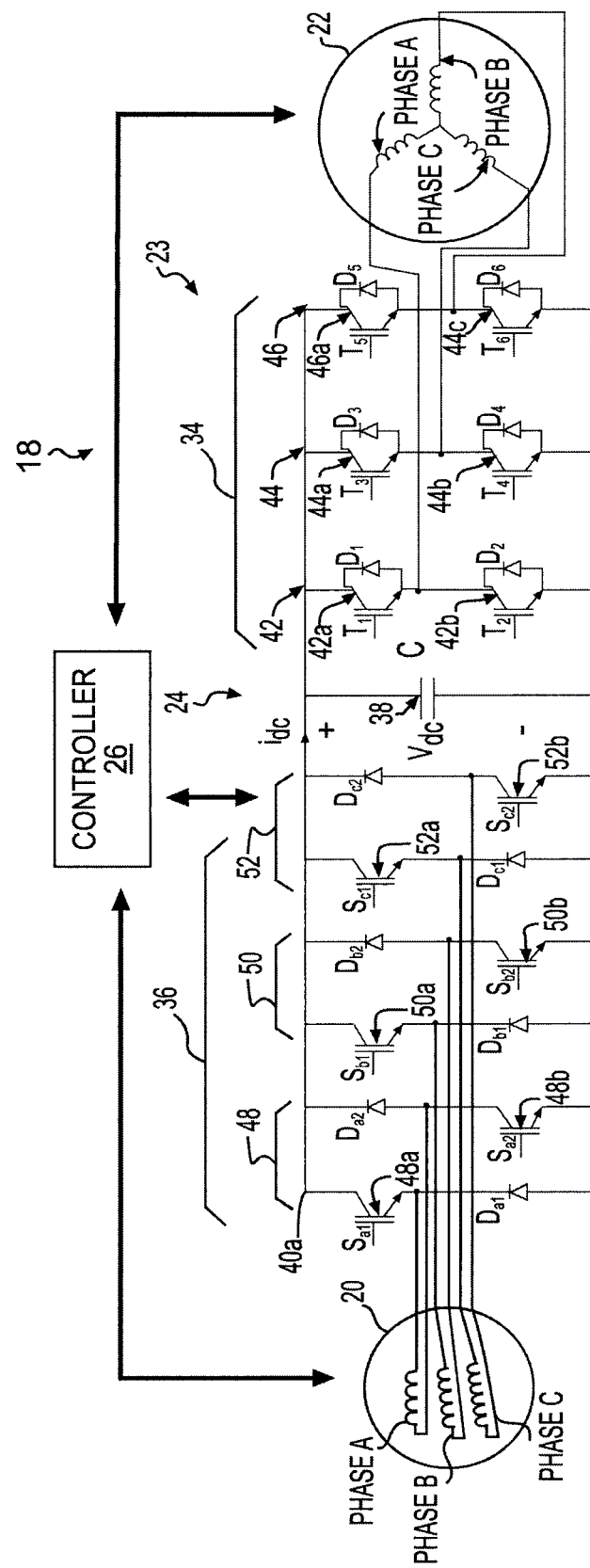
FIG. 3 shows a detailed schematic view of an exemplary disclosed circuit for use with the control system of FIG. 1.

As shown by FIG. 3, circuit 23 may include a DC bus 24 connected to motor 22 through an inverter 34; to SRG 20 through a switched reluctance (SR) power converter 36; and to controller 26. During operation, DC bus 24 may store DC electric power generated by SRG 20, and transfer the power to motor 22 in accordance with the control algorithm implemented by controller 26 and discussed below. Inverter 34 and power converter 36 may be coupled to DC bus 24 via a positive DC bus line 40a and a negative DC bus line 40b. Specifically, inverter 34 and power converter 36 may be connected to a storage device 38, such as a capacitor, via positive DC bus line 40a and negative DC bus line 40b.

Inverter 34 may be used to drive motor 22 and include a first phase portion 42 connected to the phase A coils of motor 22, a second phase portion 44 connected to the phase B coils of motor 22, and a third phase portion 46 connected to the phase C coils of motor 22. It is to be appreciated, however, that the number of phase portions included in inverter 34 may depend on the number of phases of motor 22. That is, inverter 34 could include more or less than three phase portions, and first phase portion 42 through third phase portion 46 are intended only for purposes of illustrating the present disclosure.

In one embodiment, each of first phase portion 42 through third phase portion 44 may include a first transistor package 42a, 44a, and 46a connected to a second transistor package 42b, 44b, and 46b, respectively. Each of packages 42a-46b may include, for example, an isolated gate bipolar junction transistor (IGBT) package. An IGBT package may include a power diode and an IGBT. An IGBT package can be viewed as a switch. When an appropriate voltage ($T_1$-$T_6$) is applied to the base of the IGBT, the switch may be activated and the collector may be electrically connected to the emitter to supply electric power from storage device 38 to motor 22 (i.e., switch is closed). When no voltage is applied to the base of the IGBT, no continuity between the collector and the emitter may exist (i.e., switch is open). Each power diode may protect the respective IGBT from damage caused by reverse biased current. That is, when the IGBT is "off" (i.e., switch is open), positive current flow from the emitter to the collector thereof may still be possible, albeit undesirable, due to residual power stored in the circuit. The diode may shut this current away from the IGBT and prevent damage thereto.

IGBT packages 42a and 42b may be coupled to the phase A coil of motor 22. IGBT packages 44a and 44b may be coupled to the phase B coil of motor 22. Similarly, IGBT packages 46a and 46b may be coupled to the phase C coil of motor 22. The bases of IGBTs in IGBT packages 42a and 42b, 44a and 44b, and 46a and 46b may be connected to an electronic driver circuit (not shown) called a gate driver board that provides low voltages signals to turn on and off the IGBTs according to a predetermined control algorithm. The signals may be, for example, pulse width modulated signals having duty cycles corresponding to the switching of the IGBTs.

Similarly, power converter 36 may include a first phase portion 48 connected to the phase A coils of SRG 20, a second phase portion 50 connected to the phase B coils of SRG 20, and a third phase portion 52 connected to the phase C coils of SRG 20. In one aspect, the phase A coils, the phase B coils, and the phase C coils of SRG 20 may embody coils 32a-d, coils 32e-h, and coils 32i-l of FIG. 2, respectively. It is to be appreciated, however, that the number of phase portions included in power converter 36 may depend on the number of phases of SRG 20. That is, power converter 36 could include more or less than three phase portions, depending on the construction of SRG 20, and first phase portion 48 through third phase 52 portion are intended only for purposes of illustrating the present disclosure.

Each of first phase portion 48 through third phase 52 portion may include a first transistor package 48a, 50a, and 52a connected to a second transistor package 48b, 50b, and 52b, respectively. Transistor packages may also comprise, for example, an IGBT/power diode arrangement, as shown in FIG. 3. Also, as shown in FIG. 3, the phase A coils of SRG 20 may be coupled to transistor packages 48a and 48b, the phase B coils of SRG 20 may be coupled to transistor packages 50a and 50b, and the phase C coils of SRG 20 may be coupled to transistor packages 52a and 52b. When an appropriate voltage $S_{a1}$-$S_{c2}$ is applied to the base of the respective IGBT, the switch may be activated and the collector thereof may be electrically connected to the emitter thereof. Conversely, when voltages $S_{a1}$ and $S_{a2}$ are zero or otherwise below a predetermined threshold level, no electrical continuity between the collector and the emitter may exist, and the switch is open. The packages 48a-52c of each of first phase portion 48 through third phase portion 52 may be selectively switched on and off in order to draw a DC electrical current from a desired phase of SRG 20. For example, transistor packages 48a and 48b of first phase portion 48 may be switched on simultaneously by applying appropriate voltages $S_{a1}$-$S_{a2}$ to the bases of the respective IGBTs. Upon being switched on, packages 48a and 48b may allow a DC electric current $i_{dc}$ to flow from phase A coils of SRG 20 into storage element 38 by way of input 40a and output 40b lines, charging storage element 38 to a voltage $V_{dc}$. Upon being switched off, no current from the phase A coils may flow into storage element 38. Each power diode may prevent reverse-biased current from flowing through and damaging the respective IGBT when switched off. It is to be appreciated that packages 50a and 50b, and packages 52a and 52b of second phase portion 50 and third phase portion 52 may function in the same manner with respect to phase coils B and C of SRG 20, respectively.

DC bus 24 may also be equipped with a voltage sensor to measure an instantaneous voltage $V_{dc}$ across storage device 38. That is, the sensor may measure a real-time potential between positive DC bus line 40a and negative DC bus line 40b. The sensor may generate a signal indicative of a value of the voltage, which may be communicated to controller 26 via communication link 27d for analysis in connection with the control algorithm disclosed herein.

The arrangement circuit 23 (i.e., DC bus 24, inverter 34, and/or power converter 36) discussed is intended to be exemplary only. One of ordinary skill in the art will appreciate that other such circuits are known in the art and could be used as an alternative to the circuit shown in FIG. 3 and discussed above.

Figure 4:
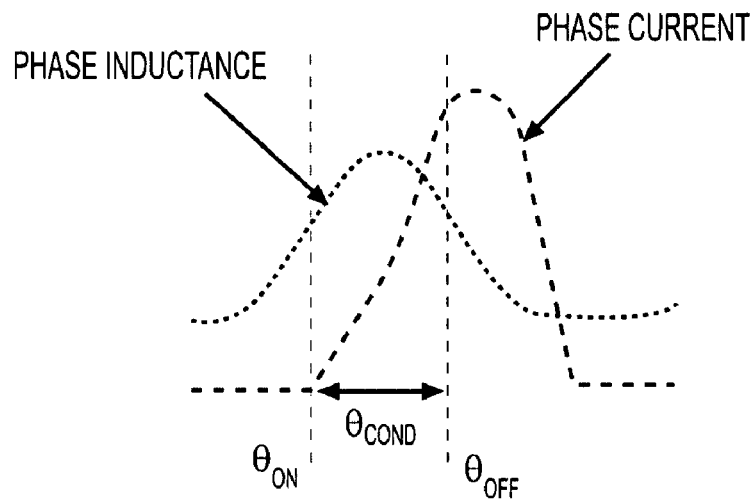
FIGS. 4 and 5 show exemplary disclosed plots of phase inductance and current response with respect to phase angle of the switched reluctance machine of FIG. 2.
Figure 5:
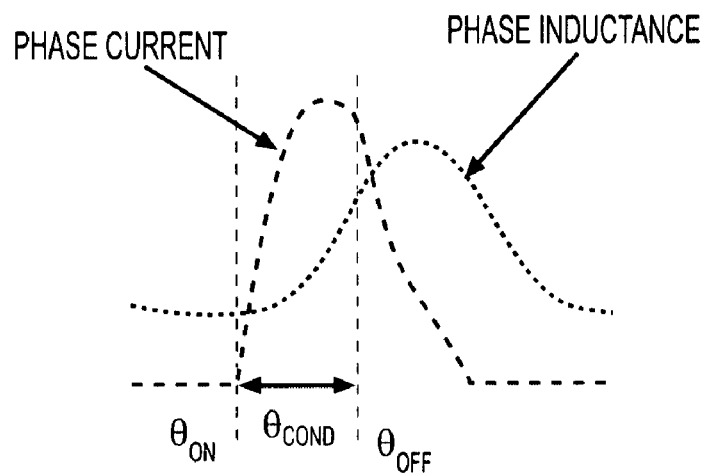

During operation, DC bus 24 must be energized such that sufficient power can be provided to the motor 22 under a variety of load demands. That is, storage element 38 must be responsively maintained at a charge level (e.g., voltage level) sufficient to allow motor to operate smoothly under varying loads. The amount of power provided to storage element 38 may depend upon the angular positions (i.e., rotational angles) of SRG 20 at which the transistor packages of each of first phase portion 48 through third phase 52 portion are switched on and off. These angular positions are known as "turn-on" and "turn-off" angles ($\theta_{on}$ and $\theta_{off}$), or "firing angles". The "conduction" angle $\theta_{cond}$ may be defined as the angular duration between the turn-on and turn-off angles as expressed in Eq. 1 below. FIGS. 4 and 5 show a phase inductance and current response for SRG 20 when operating in a generating mode and a motoring mode, respectively.

$$\theta_{cond} = \theta_{off} - \theta_{on} \qquad \text{Eq. 1.}$$

Figure 6:
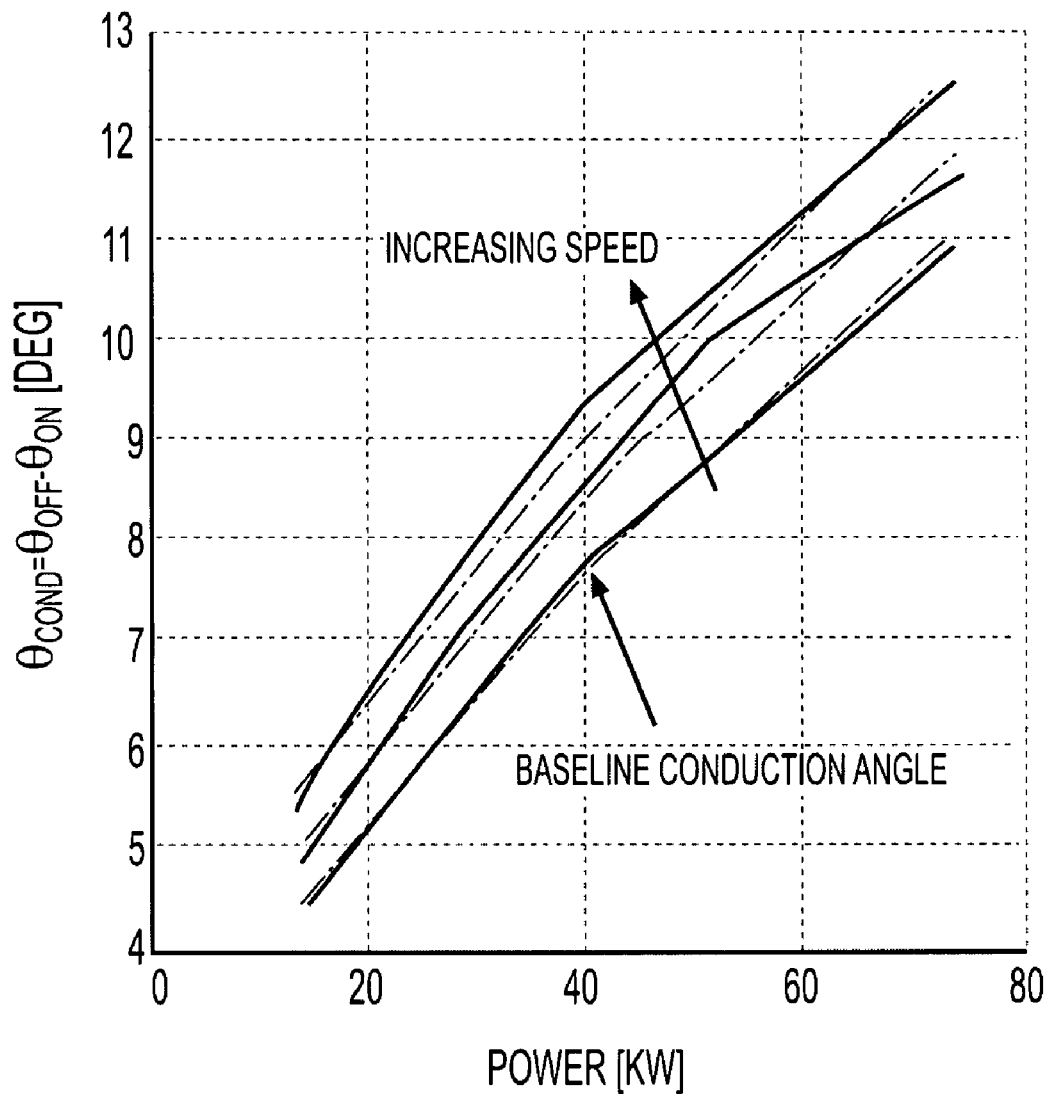
FIG. 6 shows an exemplary disclosed plot of conduction angle versus motor load demand for the switched reluctance machine of FIG. 2.

Through simulation and/or experimentation, optimum turn on and turn off angles, $\theta_{off}$ and $\theta_{on}$, and, thus, conduction angles, $\theta_{cond}$, may be computed for varying load conditions to achieve maximum efficiency for a particular system 18. For example, varying torque demands may be applied to the output shaft of motor 22 at different operating speeds, and optimum conduction angles may be determined based thereon. FIG. 6 shows an exemplary family of conduction angle curves versus load demand as a function of motor output speeds. Once the optimum conduction angles are determined, they can be utilized by controller 26 to achieve a fast dynamic system response in connection with the conduction angle control algorithm disclosed herein.

Operator interface 25 may include a monitor, a touchscreen, a keypad, a control panel, a keyboard, a joystick, a lever, pedal, a wheel, and/or another input device. Operator interface 25 may receive input from a machine operator and generate corresponding command signals in response to the input, which may be communicated to controller 26. In one embodiment, an operator's input may cause operator interface 25 to generate signals indicative of an amount of torque required by motor 22. For example, an operator may depress an accelerator pedal or manipulate a lever that commands movement of implement 16 or traction devices 14.

Controller 26 may be, for example, an electronic control module (ECM), or another processor capable of executing, and/or outputting command signals in response to received and/or stored data to affect, among other things, the conduction angle algorithm disclosed herein. Controller 26 may include computer-readable storage, such as read-only memories (ROM), random-access memories (RAM), and/or flash memory; secondary storage device(s), such as a tape-drive and/or magnetic disk drive; microprocessor(s) (CPU), and/or any other components for running an application. The microprocessor(s) may comprise any suitable combination of commercially-available or specially-constructed microprocessors for controlling system operations in response to operator input. As such, controller 26 may include instructions and/or data stored as hardware, software, and/or firmware within the memory, secondary storage device(s), and/or microprocessor(s). Alternatively or additionally, controller 26 may include and/or be associated with various other suitably arranged hardware and/or software components. For example, controller 26 may further include power supply circuitry, signal conditioning circuitry, solenoid driver circuitry, amplifier circuitry, timing circuitry, filtering circuitry, switches, and/or other types of circuitry, if desired.

Controller 26 may include, for example, maps, tables, and/or other data storage structures in the computer-readable storage to facilitate torque and/or power requirement determinations in connection with the disclosed control algorithm. For example, controller 26 may include one or more tables indexing amounts of accelerator pedal depression, implement tool control manipulation, machine inclination, and/or other operational parameters of machine monitored by controller 26 to respective amounts of required torque from motor 22 for a variety of shaft output speeds. Alternatively or additionally, controller 26 may include one or more equations to calculate the amount of torque required by motor 20 based on the monitored parameters. The amounts of required torque contained in the table(s), and/or the calculated based on equations may be related to known specifications of the machine, experimental data, and/or other available sources. It is to be appreciated that controller 24 may include another means known in the art to determine the amount of torque required by motor 22 under a specific load.

Figure 7:
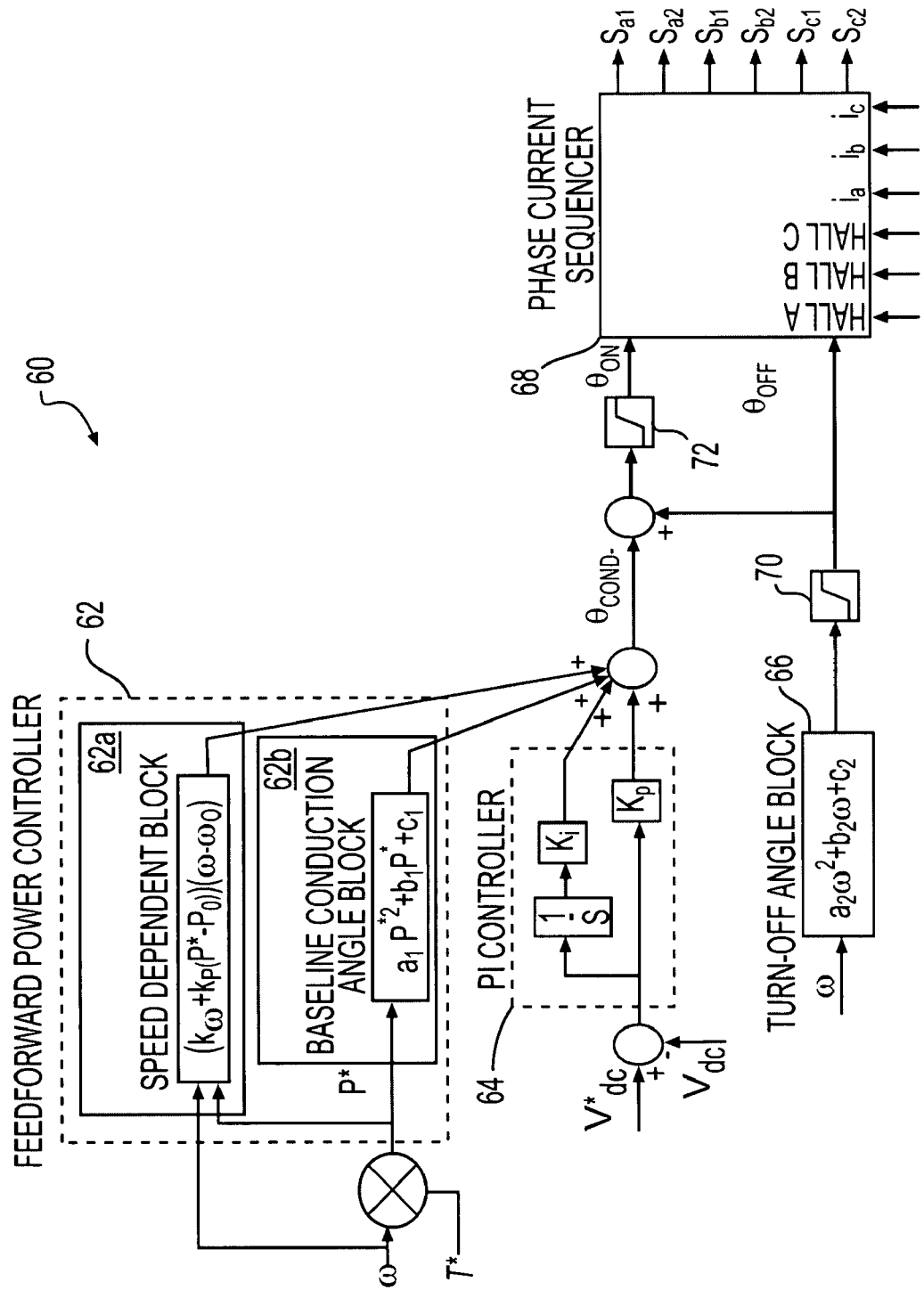
FIG. 7 shows a schematic representation of an exemplary disclosed control algorithm for use with the control system of FIG. 1.

FIG. 7 shows an exemplary control algorithm 60 that may be implemented by controller 26 to determine in real-time optimum conduction angles for SRG 20, while operating in a single-pulse mode, based on varying loads applied to motor 22. Single-pulse mode refers to a mode in which the transistor packages corresponding to each of first phase portion 48 through third phase portion 52 are switched on for the angular duration of the conduction angle, rather than pulsed or otherwise oscillated for the duration. Algorithm 60 may be divided into three subsections: a feed-forward control block 62, a feedback control block 64, and a turn-off angle control block 66. Algorithm 60 may also include a phase current sequencer 68 to drive power converter 36 in response to output from the three subsections.

Feed-forward power controller block 62 may include a baseline conduction angle block 62b, and a speed dependent correction block 62a. During operation, controller 26 may receive signals from motor 22 indicative of a real-time rotation speed of the output shaft. Controller 26 may also receive signals from motor 22, operator input devices 25, and/or sensors (not shown) monitoring operational parameters of machine 10, indicative of an amount of torque required by motor 22 at that point in time, T*. Controller 26 may determine the amount of required torque, T*, based on these signals and, for example, the tables and/or equations stored in computer-readable storage. Controller 26 may then determine a real-time amount of power P* required of motor 22 by multiplying the real-time output shaft speed ω of motor 22 with the real-time amount of required torque T* (i.e., P*=ωT*). Controller 26 may then determine a baseline conduction angle, $\theta_{baseline}$, in baseline conduction angle block 62b. The baseline conduction angle may correspond to an optimum conduction angle, $\theta_{baseline}$, of SRG 20 while operating at the rated generator speed for the given amount of power, P*, required of motor 22. In one aspect, controller 26 may determine the baseline conduction according to the following polynomial equation:

$$\theta_{baseline}=a_1P^{*2}+b_1P^*+c_1,\qquad\text{Eq. 2.}$$

In Eq. 2, $a_1$, $b_1$, and $c_1$ are predetermined polynomial coefficients determined based on simulation or experimentation for the particular SRG 20, as mentioned above; and P* is the amount of power required by the motor 22. Specifically, P* is the amount of torque required of motor 22, T*, multiplied by the shaft output speed of motor 22, ω (i.e., P*=ωT). As shown by the Eq. 2, the baseline conduction angle, $\theta_{baseline}$, may increase and decrease proportionally with increasing and decreasing required torque, T*, for a given shaft output speed ω.

Controller 26 may also determine a change in the baseline conduction angle, $\Delta\theta_{baseline}$, for varying shaft speed and load conditions of motor 22. That is, an amount of angular variation from the baseline conduction angle, $\theta_{baseline}$, for a given amount of required power, P*, while operating at the rated generator speed, ω, may be determined for varying shaft speed and load conditions. Specifically, controller 26 may determine the change in the baseline conduction angle, $\Delta\theta_{baseline}$, in speed dependent correction block 62a according to the following equation:

$$\Delta\theta_{baseline}=(k_\omega k_p(P^*-P_0))(\omega-\omega_0)\qquad\text{Eq. 3.}$$

In Eq. 3, $k_\omega$ is a speed-dependent correction term and $k_p$ is a power-dependent correction term based on simulation or experimentation for the particular SRG 20; P* is the amount of power required of motor 22 (i.e., P*=ωT*); $P_0$ is the rated power of SRG 20; ω output shaft speed of motor 22; and $\omega_0$ is the rated speed output shaft speed of SRG 20.

In one aspect, feedback control block 64 may embody a PI control block, a PID control block, or another type of gain module designed to compensate for differences between an actual output and a desired output. Specifically, feedback control block 64 may output a signal indicative of a conduction angle offset value based on variations in the real-time voltage across storage element 38, $V_{dc}$. In this manner, controller 26 may adjust the conduction angle if the DC bus voltage begins to drop or increase in response to changing load conditions to maintain the DC bus voltage at or near a desired value. For example, controller 26 may receive the signals from DC bus 24 and determine a difference between a real-time value of the voltage $V_{dc}$ across storage device 38 and a desired, or target voltage $V_{dc}^*$ across storage device 38 contained in memory. Controller 26 may then generate a signal indicative of the difference. Feedback control block 64 may then apply, for example, a proportional gain component, an integral gain component, and/or a derivative gain component to the signal, according to methods known in the art, to generate a conduction angle offset value signal. It is to be appreciated that the conduction angle offset value may indicate a change in the conduction angle of SRG 20 required as a result of variations in the DC bus voltage, $V_{dc}$.

Turn-off angle control block 66 may determine an optimum angle at which the transistor packages in first package 48 through third phase portion 52 should be switched off. Turn-off angle control block 66 may determine the optimum turn off angle, $\theta_{turn\ off}$, according to the following equation:

$$\theta_{turn\ off}=a_2\omega^2+b_2\omega+c_2\qquad\text{Eq. 4.}$$

In Eq. 4, $a_2$, $b_2$, and $c_2$ are predetermined polynomial coefficients determined based on simulation or experimentation for the particular SRG 20, and ω is the output shaft speed of motor 22.

As shown by FIG. 7, controller 26 may sum the outputs of feed-forward control block 62 and feedback control block 64 to determine an optimum conduction angle, $\theta_{cond}$, which may be subtracted from the optimum turn off angle (subject to a first limiter 70), $\theta_{turn\ off}$, to determine an optimum turn on angle (subject to a second limiter 72), $\theta_{turn\ off}$. Limiters 70 and 72 may prevent destructive changes in the operation of SRG 62 (i.e., $\theta_{turn\ on}$ and/or $\theta_{off}$ changing too quickly). The optimum turn on and turn off angles, $\theta_{turn\ on}$ and/or $\theta_{off}$, may be provided to phase current sequencer 68. Phase current sequencer 68 may monitor the signals provided by the sensors of SRG 20. That is, phase current sequencer 68 may monitor the real-time values of the Hall effect signals, $Hall_A$, $Hall_B$, and $Hall_C$, the phase currents, $i_a$, $i_b$, and $i_c$, of each of phase A through phase C of SRG 20, and/or the angular position of SRG 20. Based on these values, phase current sequencer 68 may determine a current angular position and phase excitation of SRG 20 and switch voltages $S_{a1}$, $S_{a2}$, $S_{b1}$, $S_{b2}$, $Sc_{c1}$ and $Sc^{c2}$ in accordance with the determined turn on and turn off angles, $\theta_{turn\ on}$ and $\theta_{off}$. For example, phase sequencer 68 may generate pulse width modulated signals for each of voltages $S_{a1}$, $S_{a2}$, $S_{b1}$, $S_{b2}$, $S_{c1}$, and $S_{c2}$ in which a pulse width and/or duty cycle thereof corresponds to the angular duration between $\theta_{turn\ on}$ and $\theta_{off}$. In this manner, the transistor packages of first phase portion 48 through third phase portion 52 of power converter 36 may be switched on and off to draw current from the respective phases of SRG 20 in accordance with the optimum turn on and turn off angles, $\theta_{turn\ on}$ and $\theta_{off}$.

It is to be appreciated that phase current sequencer 68 may phase shift the switched of voltages $S_{a1}$ and $S_{a2}$, $S_{b1}$ and $S_{b2}$, and $S_{c1}$ and $S_{c2}$ from each other by an appropriate angle based on the phase configuration of SRG 20. In the case that SRG 20 is a three-phase generator, as illustratively disclosed herein, the phase shift between each of $S_{a1}$ and $S_{a2}$, $S_{b1}$ and $S_{b2}$, and $S_{c1}$ and $S_{c2}$ may be 120 degrees. In the event that SRG 20 has more or less phases, however, the phase shift applied by phase current sequencer 68 may be different.

INDUSTRIAL APPLICABILITY

The disclosed generator control system may be useful in situations where a switched reluctance generator is used to drive a motor through a DC bus. In particular, the disclosed control system may improve the performance and facilitate smooth operation of the motor under a variety of load conditions. By providing a feed-forward control block that determines an optimum conduction angle for the respective phase currents of the switched reluctance generator based on an amount of torque or power required by the motor, the control algorithm may anticipatorily estimate changes in the conduction angle that may be required, before the voltage level of the DC bus begins to change to the detriment of system performance.

Figure 8:
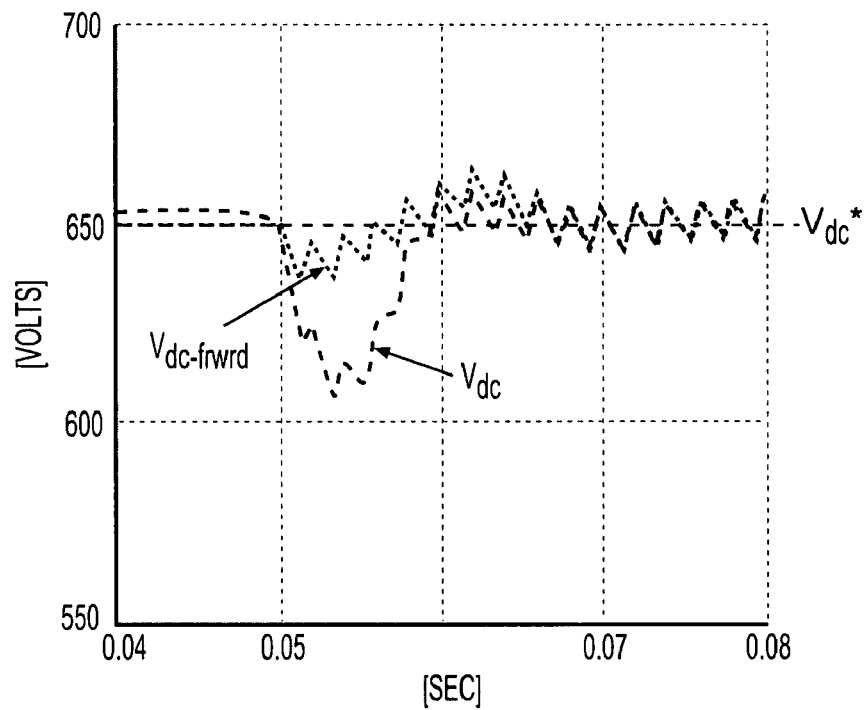
FIGS. 8 and 9 show exemplary voltage regulation and corresponding conduction angle plots of the control system of FIG. 1.
Figure 9:
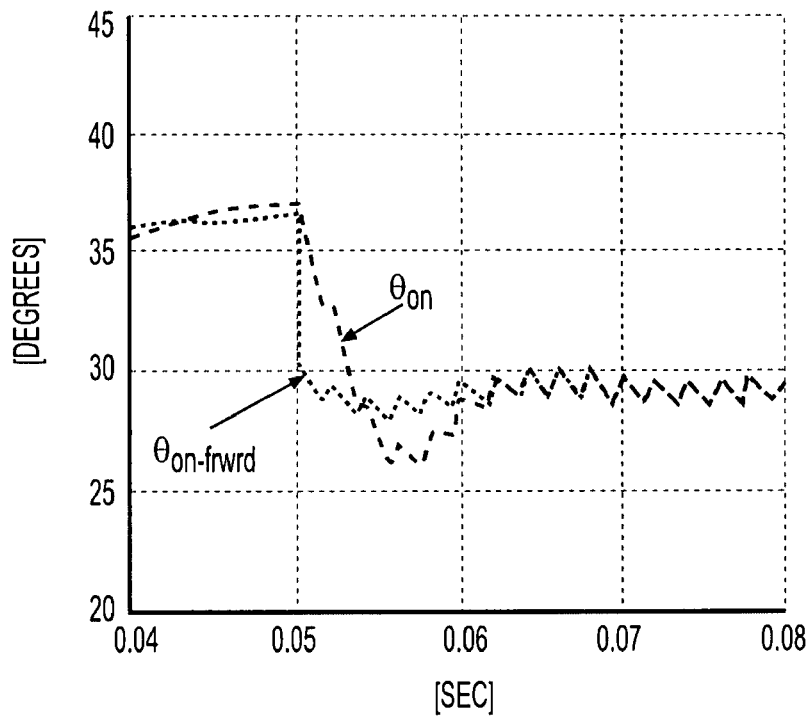

FIGS. 8 and 9 show benefits that may be realized by employing the disclosed control algorithm 60. In particular, FIGS. 8 and 9 show a scenario in which motor 22 may be used to apply a step load change to SRG 20. In FIG. 8, the $V_{dc}$* plot refers to the reference DC bus voltage (i.e., the voltage across storage device 38 which control algorithm 60 strives to maintain during operation). The $V_{dc}$ plot shows the response of the system without using feed-forward power controller 62, while the $V_{dc\_forward}$ plot shows the response of the system when employing feed-forward power control block 62. It is clear that the initial deviation (i.e., overshoot) of the DC bus voltage from the reference voltage may be much smaller when employing feed-forward control bock 62. Further, the system may reach a steady state response in a shorter period of time. That is, the transient response time of the system may be much shorter.

Referring to FIG. 9, the $\theta_{on}$ plot may show a turn-on angle calculated by the system without feed-forward power control block 62 in response to the step load change, while the $\theta_{on\_forward}$ plot may show a turn on angle calculation by the system when employing feed-forward power control block 62. It is clear that feed-forward power control block 62 may substantially improve system performance by facilitating calculation of the steady state turn-on angle in a shorter period of time. Additionally, the initial turn-on angle overshoot, as a result of the step load change, may be substantially reduced by implementing feed-forward power control block 62.

It will be apparent to those skilled in the art that various modifications and variations can be made to the disclosed system and algorithm without departing from the scope of the invention. For example, it is to be appreciated that the algorithm may equally apply to the control of a switched reluctance motor, in which the torque command may be directly used to calculate the optimum conduction angle. Similarly, the algorithm may equally apply to a system having a generator and/or a motor, each having more or less than three phases and/or different pole arrangements. Other embodiments will be apparent to those skilled in the art from consideration of the specification. It is intended that the specification and examples be considered as exemplary only, with a true scope of the invention being indicated by the following claims and their equivalents.

What is claimed is:

1. A control system, comprising:
   a generator coupled to provide electrical power through a DC bus to a motor; and
   a controller in communication with the generator, the motor, and the DC bus, the controller being configured to:
   receive an indication of a requested amount of motor torque;
   determine a conduction angle of the generator based on the requested amount of motor torque; and
   energize the DC bus with the electrical power provided by the generator based on the determined conduction angle.

2. The control system of claim 1, further comprising a sensor for sensing a rotational speed of the motor, wherein the controller is further configured to:
   receive an indication of the sensed rotational speed of the motor;
   determine a requested amount of power of the motor based on the sensed rotational speed of the motor and on the requested amount of motor torque;
   determine a rated conduction angle of the generator based on the requested amount of power of the motor; and
   determine the conduction angle based on the rated conduction angle.

3. The control system of claim 2, wherein the controller is further configured to:
   determine a deviation from the rated conduction angle of the generator based on a difference between the requested amount of power of the motor and a rated amount of power for the motor, and on a difference between the sensed rotational speed of the motor and a rated rotational speed of the motor; and
   determine the conduction angle based further on the deviation from the rated conduction angle.

4. The control system of claim 3, further comprising a sensor for sensing a voltage of the DC bus, wherein the controller is further configured to:
- determine a DC bus offset conduction angle of the generator based on a difference between the sensed voltage of the DC bus and a desired voltage of the DC bus; and
- determine the conduction angle by adding the rated conduction angle, the deviation from the rated conduction angle, and the DC bus offset conduction angle.

5. The control system of claim 1, wherein the controller is configured to energize the DC bus by coupling the electrical power to an energy storage device associated with the DC bus.

6. The control system of claim 5, wherein the motor is configured to draw the electrical power from the energy storage device and to produce a mechanical power output in response to the requested amount of torque.

7. The control system of claim 1, further including:
- a power converter coupled to at least one phase coil of the generator; and
- at least one capacitor coupled to the power converter,
- wherein the controller is configured to energize the DC bus by selectively switching the power converter to allow an electrical current stored in the at least one phase coil to pass to and energize the at least one capacitor.

8. The control system of claim 7, wherein the power converter includes least one transistor, and the controller is configured to switch the power converter by providing a voltage signal to a gate of the transistor.

9. A method of transferring power, comprising:
- providing electrical power from a generator through a DC bus to a motor;
- receiving an indication of a requested amount of motor torque;
- determining a conduction angle of the generator based on the requested amount of motor torque; and
- energizing the DC bus with the electrical power provided by the generator based on the determined conduction angle.

10. The method of claim 9, wherein determining a conduction angle includes:
- receiving an indication of a sensed rotational speed of the motor;
- determining a requested amount power of the motor based on the sensed rotational speed of the motor and on the requested amount of motor torque; and
- determining a rated conduction angle of the generator based on the requested amount of power of the motor.

11. The method of claim 10, wherein determining a conduction angle further includes determining a deviation from the rated conduction angle of the generator based on a difference between the requested amount of power of the motor and a rated amount of power of the motor, and on a difference between the sensed rotational speed of the motor and a rated rotational speed of the motor.

12. The method of claim 11, further comprising determining a DC bus offset conduction angle of the generator based on a difference between the sensed voltage of the DC bus and a desired voltage of the DC bus, wherein determining a conduction angle further includes adding the rated conduction angle of the generator, the deviation from the rated conduction angle of the generator, and the DC bus offset conduction angle.

13. The method of claim 9, wherein energizing the DC bus includes providing the electrical power to an energy storage device associated with the DC bus.

14. The method of claim 13, further including:
- drawing, by the motor, the electrical power from the energy storage device; and
- producing, by the motor, a mechanical power output in response to the requested amount of torque.

15. A machine, comprising:
- a combustion engine configured to power operations of the machine;
- a motor arranged to power a traction device to propel the machine;
- a generator coupled to receive a mechanical power input from the combustion engine, and to provide electrical power through a DC bus to the motor; and
- a controller in communication with the generator, the motor, and the DC bus, the controller being configured to:
  - receive an indication of a requested amount of motor torque;
  - determine a conduction angle of the generator based on the requested amount of motor torque; and
  - energize the DC bus with the electrical power provided by the generator based on the determined conduction angle.

16. The machine of claim 15, further comprising a sensor for sensing a rotational speed of the motor, wherein the controller is further configured to:
- receive an indication of the sensed rotational speed of the motor;
- determine a requested amount of power of the motor based on the sensed rotational speed of the motor and on the requested amount of motor torque;
- determine a rated conduction angle of the generator based on the requested amount of power of the motor; and
- determine the conduction angle based on the rated conduction angle.

17. The machine of claim 15, wherein the controller is further configured to:
- determine a deviation from the rated conduction angle of the generator based on a difference between the requested amount of power of the motor and a rated amount of power for the motor, and on a difference between the sensed rotational speed of the motor and a rated rotational speed of the motor; and
- determine the conduction angle based further on the deviation from the rated conduction angle.

18. The machine of claim 17, further comprising a sensor for sensing a voltage of the DC bus, wherein the controller is further configured to:
- determine a DC bus offset conduction angle of the generator based on a difference between the sensed voltage of the DC bus and a desired voltage of the DC bus; and
- determine the conduction angle by adding the rated conduction angle, the deviation from the rated conduction angle, and the DC bus offset conduction angle.

19. The machine of claim 15, wherein the controller is configured to energize the DC bus by coupling the electrical power to a storage element associated with the DC bus.

20. The machine of claim 19, wherein the motor is configured to draw the electrical power from the storage element and produce a mechanical power output in response to the requested amount of motor torque.

* * * * *